US011676192B1

(12) United States Patent
Moore et al.

(10) Patent No.: US 11,676,192 B1
(45) Date of Patent: Jun. 13, 2023

(54) LOCALIZED SORT OF RANKED PRODUCT RECOMMENDATIONS BASED ON PREDICTED USER INTENT

(71) Applicant: Overstock.com, Inc., Salt Lake City, UT (US)

(72) Inventors: Seth Moore, Lehi, UT (US); Yugang Hu, Salt Lake City, UT (US)

(73) Assignee: Overstock.com, Inc., Midvale, UT (US)

( * ) Notice: Subject to any disclaimer, the term of this patent is extended or adjusted under 35 U.S.C. 154(b) by 431 days.

(21) Appl. No.: 14/806,297

(22) Filed: Jul. 22, 2015

Related U.S. Application Data

(63) Continuation-in-part of application No. 14/213,755, filed on Mar. 14, 2014, now abandoned.

(60) Provisional application No. 61/798,502, filed on Mar. 15, 2013.

(51) Int. Cl.
| | |
|---|---|
| *G06Q 30/0601* | (2023.01) |
| *G06F 16/248* | (2019.01) |
| *G06F 16/9535* | (2019.01) |
| *G06F 16/2457* | (2019.01) |

(52) U.S. Cl.
CPC ....... *G06Q 30/0631* (2013.01); *G06F 16/248* (2019.01); *G06F 16/24578* (2019.01); *G06F 16/9535* (2019.01)

(58) Field of Classification Search
CPC ............. G06F 16/24578; G06F 16/248; G06F 16/9535; G06Q 30/06–0645; G06Q 30/08; G06Q 50/01
See application file for complete search history.

(56) References Cited

U.S. PATENT DOCUMENTS

| | | |
|---|---|---|
| 3,573,747 A | 4/1971 | Adams et al. |
| 3,581,072 A | 5/1971 | Nymeyer |
| 4,412,287 A | 10/1983 | Braddock, III |
| 4,674,044 A | 6/1987 | Kalmus et al. |
| 4,677,552 A | 6/1987 | Sibley, Jr. |
| 4,789,928 A | 12/1988 | Fujisaki |
| 4,799,156 A | 1/1989 | Shavit et al. |
| 4,808,987 A | 2/1989 | Takeda et al. |

(Continued)

FOREIGN PATENT DOCUMENTS

| | | |
|---|---|---|
| CA | 2253543 | 10/1997 |
| CA | 2347812 | 5/2000 |

(Continued)

OTHER PUBLICATIONS

T. Y. Lee, S. Li and R. Wei, "Needs-Centric Searching and Ranking Based on Customer Reviews," 2008 10th IEEE Conference on E-Commerce Technology and the Fifth IEEE Conference on Enterprise Computing, E-Commerce and E-Services, Washington, DC, 2008, pp. 128-135. (Year: 2008).*

(Continued)

*Primary Examiner* — Adam L Levine
(74) *Attorney, Agent, or Firm* — Clayton Howarth, P.C.

(57) ABSTRACT

A system for providing product recommendations to online visitors to an e-commerce website is provided. The system may include program comprising instructions that, when executed by a processor, cause the processor to sort a list of products based on a comparison of a user's interactions with the e-commerce website and previous user interactions with the same e-commerce website.

16 Claims, 4 Drawing Sheets

(56) References Cited

U.S. PATENT DOCUMENTS

| | | |
|---|---|---|
| 4,823,265 A | 4/1989 | Nelson |
| 4,854,516 A | 8/1989 | Yamada |
| 4,903,201 A | 2/1990 | Wagner |
| RE33,316 E | 8/1990 | Katsuta et al. |
| 5,027,110 A | 6/1991 | Chang et al. |
| 5,053,956 A | 10/1991 | Donald et al. |
| 5,063,507 A | 11/1991 | Lindsey et al. |
| 5,077,665 A | 12/1991 | Silverman et al. |
| 5,101,353 A | 3/1992 | Lupien et al. |
| 5,136,501 A | 8/1992 | Silverman et al. |
| 5,168,446 A | 12/1992 | Wiseman |
| 5,205,200 A | 4/1993 | Wright |
| 5,243,515 A | 9/1993 | Lee |
| 5,258,908 A | 11/1993 | Hartheimer et al. |
| 5,280,422 A | 1/1994 | Moe et al. |
| 5,297,031 A | 3/1994 | Gutterman et al. |
| 5,297,032 A | 3/1994 | Trojan et al. |
| 5,301,350 A | 4/1994 | Rogan et al. |
| 5,305,200 A | 4/1994 | Hartheimer et al. |
| 5,325,297 A | 6/1994 | Bird et al. |
| 5,329,589 A | 7/1994 | Fraser et al. |
| 5,347,632 A | 9/1994 | Filepp et al. |
| 5,375,055 A | 12/1994 | Togher et al. |
| 5,377,354 A | 12/1994 | Scannell et al. |
| 5,394,324 A | 2/1995 | Clearwater |
| 5,407,433 A | 4/1995 | Loomas |
| 5,411,483 A | 5/1995 | Loomas et al. |
| 5,426,281 A | 6/1995 | Abecassis |
| 5,485,510 A | 1/1996 | Colbert |
| 5,493,677 A | 2/1996 | Balogh et al. |
| 5,553,145 A | 9/1996 | Micali |
| 5,557,728 A | 9/1996 | Garrett et al. |
| 5,579,471 A | 11/1996 | Barber et al. |
| 5,596,994 A | 1/1997 | Bro |
| 5,598,557 A | 1/1997 | Doner et al. |
| 5,621,790 A | 4/1997 | Grossman et al. |
| 5,640,569 A | 6/1997 | Miller et al. |
| 5,657,389 A | 8/1997 | Fouvener |
| 5,664,111 A | 9/1997 | Nahan et al. |
| 5,664,115 A | 9/1997 | Fraser |
| 5,689,652 A | 11/1997 | Lupien et al. |
| 5,694,546 A | 12/1997 | Reisman |
| 5,706,457 A | 1/1998 | Dwyer et al. |
| 5,710,889 A | 1/1998 | Clark et al. |
| 5,715,314 A | 2/1998 | Payne et al. |
| 5,715,402 A | 2/1998 | Popolo |
| 5,717,989 A | 2/1998 | Tozzoli et al. |
| 5,721,908 A | 2/1998 | Lagarde et al. |
| 5,722,418 A | 3/1998 | Bro |
| 5,727,165 A | 3/1998 | Ordish et al. |
| 5,737,599 A | 4/1998 | Rowe et al. |
| 5,760,917 A | 6/1998 | Sheridan |
| 5,761,496 A | 6/1998 | Hattori |
| 5,761,655 A | 6/1998 | Hoffman |
| 5,761,662 A | 6/1998 | Dasan |
| 5,771,291 A | 6/1998 | Newton et al. |
| 5,771,380 A | 6/1998 | Tanaka et al. |
| 5,778,367 A | 7/1998 | Wesinger, Jr. et al. |
| 5,790,790 A | 8/1998 | Smith et al. |
| 5,794,216 A | 8/1998 | Brown |
| 5,794,219 A | 8/1998 | Brown |
| 5,796,395 A | 8/1998 | de Hond |
| 5,799,285 A | 8/1998 | Klingman |
| 5,803,500 A | 9/1998 | Mossberg |
| 5,818,914 A | 10/1998 | Fujisaki |
| 5,826,244 A | 10/1998 | Huberman |
| 5,835,896 A | 11/1998 | Fisher et al. |
| 5,845,266 A | 12/1998 | Lupien et al. |
| 5,850,442 A | 12/1998 | Muftic |
| 5,870,754 A | 2/1999 | Dimitrova et al. |
| 5,872,848 A | 2/1999 | Romney et al. |
| 5,873,069 A | 2/1999 | Reuhl et al. |
| 5,873,080 A | 2/1999 | Coden et al. |
| 5,884,056 A | 3/1999 | Steele |
| 5,890,138 A | 3/1999 | Godin et al. |
| 5,890,175 A | 3/1999 | Wong et al. |
| 5,905,975 A | 5/1999 | Ausubel |
| 5,907,547 A | 5/1999 | Foladare et al. |
| 5,913,215 A | 6/1999 | Rubinstein et al. |
| 5,922,074 A | 7/1999 | Richard et al. |
| 5,924,072 A | 7/1999 | Havens |
| 5,926,794 A | 7/1999 | Fethe |
| 5,948,040 A | 9/1999 | DeLorme et al. |
| 5,948,061 A | 9/1999 | Merriman et al. |
| 5,970,490 A | 10/1999 | Morgenstern |
| 5,974,396 A | 10/1999 | Anderson et al. |
| 5,974,412 A | 10/1999 | Hazlehurst et al. |
| 5,986,662 A | 11/1999 | Argiro et al. |
| 5,987,446 A | 11/1999 | Corey et al. |
| 5,991,739 A | 11/1999 | Cupps et al. |
| 5,999,915 A | 12/1999 | Nahan et al. |
| 6,012,053 A | 1/2000 | Pant et al. |
| 6,029,141 A | 2/2000 | Bezos et al. |
| 6,035,288 A | 3/2000 | Solomon |
| 6,035,402 A | 3/2000 | Vaeth et al. |
| 6,044,363 A | 3/2000 | Mori et al. |
| 6,045,447 A | 4/2000 | Yoshizawa et al. |
| 6,047,264 A | 4/2000 | Fisher et al. |
| 6,049,797 A | 4/2000 | Guha |
| 6,055,518 A | 4/2000 | Franklin et al. |
| 6,058,379 A | 5/2000 | Odom et al. |
| 6,058,417 A | 5/2000 | Hess et al. |
| 6,058,428 A | 5/2000 | Wang et al. |
| 6,061,448 A | 5/2000 | Smith et al. |
| 6,065,041 A | 5/2000 | Lum et al. |
| 6,070,125 A | 5/2000 | Murphy et al. |
| 6,073,117 A | 6/2000 | Oyanagi et al. |
| 6,078,914 A | 6/2000 | Redfern |
| 6,085,176 A | 7/2000 | Woolston |
| 6,104,815 A | 8/2000 | Alcorn et al. |
| 6,119,137 A | 9/2000 | Smith et al. |
| 6,128,649 A | 10/2000 | Smith et al. |
| 6,141,010 A | 10/2000 | Hoyle |
| 6,167,382 A | 12/2000 | Sparks et al. |
| 6,178,408 B1 | 1/2001 | Copple et al. |
| 6,185,558 B1 * | 2/2001 | Bowman ............... G06Q 30/02 705/37 |
| 6,192,407 B1 | 2/2001 | Smith et al. |
| 6,199,077 B1 | 3/2001 | Inala et al. |
| 6,202,051 B1 | 3/2001 | Woolston |
| 6,202,061 B1 | 3/2001 | Khosla et al. |
| 6,226,412 B1 | 5/2001 | Schwab |
| 6,243,691 B1 | 6/2001 | Fisher et al. |
| 6,269,238 B1 | 7/2001 | Iggulden |
| 6,271,840 B1 | 8/2001 | Finseth et al. |
| 6,275,820 B1 | 8/2001 | Navin-Chandra et al. |
| 6,275,829 B1 | 8/2001 | Angiulo et al. |
| 6,356,879 B2 | 3/2002 | Aggarwal et al. |
| 6,356,905 B1 | 3/2002 | Gershman et al. |
| 6,356,908 B1 | 3/2002 | Brown et al. |
| 6,366,899 B1 | 4/2002 | Kernz |
| 6,370,527 B1 | 4/2002 | Singhai |
| 6,373,933 B1 | 4/2002 | Sarkki et al. |
| 6,374,260 B1 | 4/2002 | Hoffert et al. |
| 6,381,510 B1 | 4/2002 | Amidhozour et al. |
| 6,415,270 B1 | 7/2002 | Rackson |
| 6,415,320 B1 | 7/2002 | Hess et al. |
| 6,434,556 B1 | 8/2002 | Levin et al. |
| 6,456,307 B1 | 9/2002 | Bates et al. |
| 6,460,020 B1 | 10/2002 | Pool et al. |
| 6,466,917 B1 | 10/2002 | Goyal et al. |
| 6,484,149 B1 | 11/2002 | Jammes et al. |
| 6,489,968 B1 | 12/2002 | Ortega et al. |
| 6,522,955 B1 | 2/2003 | Colborn |
| 6,523,037 B1 | 2/2003 | Monahan et al. |
| 6,601,061 B1 | 7/2003 | Holt et al. |
| 6,604,107 B1 | 8/2003 | Wang |
| 6,625,764 B1 | 9/2003 | Dawson |
| 6,643,696 B2 | 11/2003 | Davis et al. |
| 6,661,431 B1 | 12/2003 | Stuart et al. |
| 6,665,838 B1 | 12/2003 | Brown et al. |
| 6,675,178 B1 | 1/2004 | Chinchar |
| 6,694,436 B1 | 2/2004 | Audebert |
| 6,701,310 B1 | 3/2004 | Sugiura et al. |

(56) References Cited

U.S. PATENT DOCUMENTS

| | | | |
|---|---|---|---|
| 6,718,536 B2 | 4/2004 | Dupaquis | |
| 6,725,268 B1 | 4/2004 | Jackel et al. | |
| 6,728,704 B2 | 4/2004 | Mao et al. | |
| 6,732,161 B1 | 5/2004 | Hess et al. | |
| 6,732,162 B1 | 5/2004 | Wood et al. | |
| 6,801,909 B2 | 10/2004 | Delgado et al. | |
| 6,856,693 B2 | 2/2005 | Hurwitz | |
| 6,889,054 B2 | 5/2005 | Himmel et al. | |
| 6,907,401 B1 | 6/2005 | Mittal et al. | |
| 6,912,505 B2 * | 6/2005 | Linden | G06Q 30/02 705/14.53 |
| 6,978,273 B1 | 12/2005 | Bonneau et al. | |
| 7,043,450 B2 | 5/2006 | Velez et al. | |
| 7,069,242 B1 | 6/2006 | Sheth et al. | |
| 7,076,453 B2 | 7/2006 | Jammes et al. | |
| 7,076,504 B1 | 7/2006 | Handel et al. | |
| 7,080,030 B2 | 7/2006 | Eglen et al. | |
| 7,099,891 B2 | 8/2006 | Harris et al. | |
| 7,100,111 B2 | 8/2006 | McElfresh et al. | |
| 7,100,195 B1 | 8/2006 | Underwood | |
| 7,117,207 B1 | 10/2006 | Kerschberg et al. | |
| 7,127,416 B1 | 10/2006 | Tenorio | |
| 7,165,091 B1 | 1/2007 | Lunenfeld | |
| 7,167,910 B2 | 1/2007 | Farnham et al. | |
| 7,216,115 B1 | 5/2007 | Walters et al. | |
| 7,240,016 B1 | 7/2007 | Sturgis | |
| 7,254,547 B1 | 8/2007 | Beck et al. | |
| 7,305,614 B2 | 12/2007 | Chen et al. | |
| 7,318,037 B2 | 1/2008 | Solari | |
| 7,324,966 B2 | 1/2008 | Scheer | |
| 7,340,249 B2 | 3/2008 | Moran et al. | |
| 7,349,668 B2 | 3/2008 | Ilan et al. | |
| 7,353,188 B2 | 4/2008 | Yim et al. | |
| 7,366,755 B1 | 4/2008 | Cuomo et al. | |
| 7,379,890 B2 | 5/2008 | Myr et al. | |
| 7,380,217 B2 | 5/2008 | Gvelesiani | |
| 7,383,320 B1 | 6/2008 | Silberstein et al. | |
| 7,401,025 B1 | 7/2008 | Lokitz | |
| 7,447,646 B1 | 11/2008 | Agarwal et al. | |
| 7,451,476 B1 | 11/2008 | Banks | |
| 7,454,464 B2 | 11/2008 | Puthenkulam et al. | |
| 7,457,730 B2 | 11/2008 | Degnan | |
| 7,493,521 B1 | 2/2009 | Li et al. | |
| 7,496,525 B1 | 2/2009 | Mitchell | |
| 7,496,527 B2 | 2/2009 | Silverstein et al. | |
| 7,496,582 B2 | 2/2009 | Farnham et al. | |
| 7,516,094 B2 | 4/2009 | Perkowski | |
| 7,539,696 B1 | 5/2009 | Greener et al. | |
| 7,546,625 B1 | 6/2009 | Kamangar | |
| 7,552,067 B2 | 6/2009 | Nephew et al. | |
| 7,565,615 B2 | 7/2009 | Ebert | |
| 7,606,743 B2 | 10/2009 | Orzell et al. | |
| 7,610,212 B2 | 10/2009 | Klett et al. | |
| 7,653,573 B2 | 1/2010 | Hayes, Jr. et al. | |
| 7,834,883 B2 | 11/2010 | Adams | |
| 7,904,348 B2 | 3/2011 | Johnson et al. | |
| 7,912,748 B1 | 3/2011 | Rosenberg et al. | |
| 7,921,031 B2 | 4/2011 | Crysel | |
| 7,941,751 B2 | 5/2011 | Ebert | |
| 7,979,340 B2 | 7/2011 | MacDonald Korth et al. | |
| 7,983,950 B2 | 7/2011 | DeVita | |
| 7,983,963 B2 | 7/2011 | Byrne et al. | |
| 8,086,643 B1 | 12/2011 | Tenorio | |
| 8,112,303 B2 | 2/2012 | Eglen et al. | |
| 8,140,989 B2 | 3/2012 | Cohen et al. | |
| 8,166,155 B1 | 4/2012 | Rachmeler et al. | |
| 8,204,799 B1 | 6/2012 | Murray et al. | |
| 8,214,264 B2 | 7/2012 | Kasavin et al. | |
| 8,214,804 B2 | 7/2012 | Robertson | |
| 8,260,852 B1 | 9/2012 | Cselle | |
| 8,312,056 B1 | 11/2012 | Peng et al. | |
| 8,326,662 B1 | 12/2012 | Byrne et al. | |
| 8,370,269 B2 | 2/2013 | MacDonald-Korth et al. | |
| 8,370,435 B1 | 2/2013 | Bonefas | |
| 8,392,356 B2 | 3/2013 | Stoner et al. | |
| 8,452,691 B2 | 5/2013 | MacDonald Korth et al. | |
| 8,473,316 B1 | 6/2013 | Panzitta et al. | |
| 8,494,912 B2 | 7/2013 | Fraser et al. | |
| 8,545,265 B2 | 10/2013 | Sakamoto et al. | |
| 8,577,740 B1 | 11/2013 | Murray et al. | |
| 8,583,480 B2 | 11/2013 | Byrne | |
| 8,630,960 B2 | 1/2014 | Gross | |
| 8,676,632 B1 | 3/2014 | Watson et al. | |
| 8,693,494 B2 | 4/2014 | Fiatal | |
| 8,719,075 B2 | 5/2014 | MacDonald Korth et al. | |
| 8,793,650 B2 | 7/2014 | Hilerio et al. | |
| 9,047,341 B2 | 6/2015 | Pan | |
| 9,047,642 B2 | 6/2015 | Byrne et al. | |
| 9,448,692 B1 | 9/2016 | Mierau | |
| 9,483,788 B2 | 11/2016 | Martin | |
| 9,741,080 B2 | 8/2017 | Byrne | |
| 9,747,622 B1 | 8/2017 | Johnson et al. | |
| 9,805,425 B2 | 10/2017 | MacDonald-Korth et al. | |
| 9,928,752 B2 | 3/2018 | Byrne et al. | |
| 9,940,659 B1 * | 4/2018 | Behbahani | G06Q 30/0627 |
| 10,074,118 B1 | 9/2018 | Johnson et al. | |
| 10,102,287 B2 | 10/2018 | Martin | |
| 10,269,081 B1 | 4/2019 | Byrne | |
| 10,423,997 B2 | 9/2019 | MacDonald Korth et al. | |
| 10,534,845 B2 | 1/2020 | Noursalehi et al. | |
| 10,769,219 B1 | 9/2020 | Martin | |
| 10,810,654 B1 | 10/2020 | Robertson et al. | |
| 2001/0014868 A1 | 8/2001 | Herz et al. | |
| 2001/0034667 A1 | 10/2001 | Petersen | |
| 2001/0034668 A1 | 10/2001 | Whitworth | |
| 2001/0044751 A1 | 11/2001 | Pugliese et al. | |
| 2001/0047290 A1 | 11/2001 | Petras et al. | |
| 2001/0047308 A1 | 11/2001 | Kaminsky et al. | |
| 2001/0051996 A1 | 12/2001 | Cooper et al. | |
| 2002/0002513 A1 | 1/2002 | Chiasson | |
| 2002/0007356 A1 | 1/2002 | Rice et al. | |
| 2002/0013721 A1 | 1/2002 | Capel et al. | |
| 2002/0019763 A1 | 2/2002 | Linden | |
| 2002/0022995 A1 | 2/2002 | Miller et al. | |
| 2002/0023059 A1 | 2/2002 | Bari et al. | |
| 2002/0026390 A1 | 2/2002 | Ulenas et al. | |
| 2002/0029187 A1 | 3/2002 | Meehan et al. | |
| 2002/0038312 A1 | 3/2002 | Donner et al. | |
| 2002/0040352 A1 | 4/2002 | McCormick | |
| 2002/0042738 A1 | 4/2002 | Srinivasan et al. | |
| 2002/0049622 A1 | 4/2002 | Lettich et al. | |
| 2002/0056044 A1 | 5/2002 | Andersson | |
| 2002/0099578 A1 | 7/2002 | Eicher et al. | |
| 2002/0099579 A1 | 7/2002 | Scelzo et al. | |
| 2002/0099602 A1 | 7/2002 | Moskowitz et al. | |
| 2002/0107718 A1 | 8/2002 | Morrill et al. | |
| 2002/0107853 A1 | 8/2002 | Hofmann et al. | |
| 2002/0111826 A1 | 8/2002 | Potter | |
| 2002/0120537 A1 | 8/2002 | Campbell et al. | |
| 2002/0123957 A1 | 9/2002 | Notarius et al. | |
| 2002/0124100 A1 | 9/2002 | Adams | |
| 2002/0129282 A1 | 9/2002 | Hopkins | |
| 2002/0133502 A1 | 9/2002 | Rosenthal | |
| 2002/0138399 A1 | 9/2002 | Hayes et al. | |
| 2002/0147625 A1 | 10/2002 | Kolke | |
| 2002/0156802 A1 | 10/2002 | Takayama et al. | |
| 2002/0161648 A1 | 10/2002 | Mason et al. | |
| 2002/0188777 A1 | 12/2002 | Kraft et al. | |
| 2002/0194049 A1 | 12/2002 | Boyd | |
| 2002/0198784 A1 | 12/2002 | Shaak et al. | |
| 2002/0198882 A1 | 12/2002 | Linden et al. | |
| 2003/0004855 A1 | 1/2003 | Dutta et al. | |
| 2003/0005046 A1 | 1/2003 | Kavanagh et al. | |
| 2003/0009362 A1 | 1/2003 | Cifani et al. | |
| 2003/0009392 A1 | 1/2003 | Perkowski | |
| 2003/0014400 A1 | 1/2003 | Siegel | |
| 2003/0028451 A1 | 2/2003 | Ananian | |
| 2003/0028605 A1 | 2/2003 | Millett et al. | |
| 2003/0032409 A1 | 2/2003 | Hutcheson et al. | |
| 2003/0035138 A1 | 2/2003 | Schilling | |
| 2003/0036914 A1 | 2/2003 | Fitzpatrick et al. | |
| 2003/0040970 A1 | 2/2003 | Miller | |
| 2003/0041008 A1 | 2/2003 | Grey et al. | |
| 2003/0046149 A1 | 3/2003 | Wong | |

(56) References Cited

U.S. PATENT DOCUMENTS

| | | |
|---|---|---|
| 2003/0069740 A1 | 4/2003 | Zeidman |
| 2003/0069790 A1 | 4/2003 | Kane |
| 2003/0069825 A1 | 4/2003 | Burk et al. |
| 2003/0088467 A1 | 5/2003 | Culver |
| 2003/0088511 A1 | 5/2003 | Karboulonis et al. |
| 2003/0093331 A1 | 5/2003 | Childs et al. |
| 2003/0097352 A1 | 5/2003 | Gutta et al. |
| 2003/0105682 A1 | 6/2003 | Dicker et al. |
| 2003/0110100 A1 | 6/2003 | Wirth, Jr. |
| 2003/0119492 A1 | 6/2003 | Timmins et al. |
| 2003/0083961 A1 | 7/2003 | Bezos et al. |
| 2003/0131095 A1 | 7/2003 | Kumhyr et al. |
| 2003/0139969 A1 | 7/2003 | Scroggie et al. |
| 2003/0140007 A1 | 7/2003 | Kramer |
| 2003/0140121 A1 | 7/2003 | Adams |
| 2003/0158792 A1 | 8/2003 | Perkowski |
| 2003/0163340 A1 | 8/2003 | Fitzpatrick et al. |
| 2003/0167213 A1 | 9/2003 | Jammes et al. |
| 2003/0167222 A1 | 9/2003 | Mehrotra et al. |
| 2003/0177103 A1 | 9/2003 | Ivanov et al. |
| 2003/0187745 A1 | 10/2003 | Hobday et al. |
| 2003/0200156 A1 | 10/2003 | Roseman et al. |
| 2003/0204449 A1 | 10/2003 | Kotas et al. |
| 2003/0217002 A1 | 11/2003 | Enborg |
| 2003/0220835 A1 | 11/2003 | Barnes, Jr. |
| 2004/0006509 A1 | 1/2004 | Mannik et al. |
| 2004/0015416 A1 | 1/2004 | Foster et al. |
| 2004/0029567 A1 | 2/2004 | Timmins et al. |
| 2004/0041836 A1 | 3/2004 | Zaner et al. |
| 2004/0044563 A1 | 3/2004 | Stein |
| 2004/0055017 A1 | 3/2004 | Delpuch et al. |
| 2004/0058710 A1 | 3/2004 | Timmins et al. |
| 2004/0073476 A1 | 4/2004 | Donahue et al. |
| 2004/0078388 A1 | 4/2004 | Melman |
| 2004/0107136 A1 | 6/2004 | Nemirofsky et al. |
| 2004/0117242 A1 | 6/2004 | Conrad et al. |
| 2004/0122083 A1 | 6/2004 | Lippert et al. |
| 2004/0122681 A1 | 6/2004 | Ruvolo et al. |
| 2004/0122735 A1 | 6/2004 | Meshkin |
| 2004/0122855 A1 | 6/2004 | Ruvolo et al. |
| 2004/0128183 A1 | 7/2004 | Challey et al. |
| 2004/0128283 A1 | 7/2004 | Wang |
| 2004/0128320 A1 | 7/2004 | Grove et al. |
| 2004/0143731 A1 | 7/2004 | Audebert |
| 2004/0148232 A1 | 7/2004 | Fushimi et al. |
| 2004/0172323 A1 | 9/2004 | Stamm |
| 2004/0172379 A1 | 9/2004 | Mott et al. |
| 2004/0174979 A1 | 9/2004 | Hutton et al. |
| 2004/0186766 A1 | 9/2004 | Fellenstein et al. |
| 2004/0199496 A1 | 10/2004 | Liu et al. |
| 2004/0199905 A1 | 10/2004 | Fagin et al. |
| 2004/0204989 A1 | 10/2004 | Dicker |
| 2004/0204991 A1 | 10/2004 | Monahan et al. |
| 2004/0230989 A1 | 11/2004 | Macey |
| 2004/0240642 A1 | 12/2004 | Crandell et al. |
| 2004/0249727 A1 | 12/2004 | Cook, Jr. et al. |
| 2004/0267717 A1 | 12/2004 | Slackman |
| 2005/0010925 A1 | 1/2005 | Khawand et al. |
| 2005/0021666 A1 | 1/2005 | Dinnage et al. |
| 2005/0038733 A1 | 2/2005 | Foster et al. |
| 2005/0044254 A1 | 2/2005 | Smith |
| 2005/0055306 A1 | 3/2005 | Miller et al. |
| 2005/0060664 A1 | 3/2005 | Rogers |
| 2005/0097204 A1 | 5/2005 | Horowitz et al. |
| 2005/0114229 A1 | 5/2005 | Ackley et al. |
| 2005/0120311 A1 | 6/2005 | Thrall |
| 2005/0131837 A1 | 6/2005 | Sanctis et al. |
| 2005/0144064 A1 | 6/2005 | Calabria et al. |
| 2005/0193333 A1 | 9/2005 | Ebert |
| 2005/0197846 A1 | 9/2005 | Pezaris et al. |
| 2005/0197950 A1 | 9/2005 | Moya et al. |
| 2005/0198031 A1 | 9/2005 | Pezaris et al. |
| 2005/0202390 A1 | 9/2005 | Allen et al. |
| 2005/0203888 A1 | 9/2005 | Woosley et al. |
| 2005/0216300 A1 | 9/2005 | Appelman et al. |
| 2005/0262067 A1 | 11/2005 | Lee et al. |
| 2005/0273378 A1 | 12/2005 | Macdonald-Korth et al. |
| 2006/0009994 A1 | 1/2006 | Hogg et al. |
| 2006/0010105 A1 | 1/2006 | Sarukkai et al. |
| 2006/0015498 A1* | 1/2006 | Sarmiento ......... G06F 17/30867 |
| 2006/0031240 A1 | 2/2006 | Eyal et al. |
| 2006/0041638 A1 | 2/2006 | Whittaker et al. |
| 2006/0058048 A1 | 3/2006 | Kapoor et al. |
| 2006/0069623 A1 | 3/2006 | MacDonald-Korth et al. |
| 2006/0085251 A1 | 4/2006 | Greene |
| 2006/0173817 A1 | 8/2006 | Chowdhury et al. |
| 2006/0206479 A1 | 9/2006 | Mason |
| 2006/0230035 A1 | 10/2006 | Bailey et al. |
| 2006/0235752 A1 | 10/2006 | Kavanagh et al. |
| 2006/0259360 A1 | 11/2006 | Flinn et al. |
| 2006/0271671 A1 | 11/2006 | Hansen |
| 2006/0282304 A1 | 11/2006 | Hansen |
| 2007/0005424 A1 | 1/2007 | Arauz |
| 2007/0027760 A1 | 2/2007 | Collins et al. |
| 2007/0027814 A1 | 2/2007 | Tuoriniemi |
| 2007/0073641 A1 | 3/2007 | Perry et al. |
| 2007/0077025 A1 | 4/2007 | Mino |
| 2007/0078726 A1 | 4/2007 | MacDonald Korth et al. |
| 2007/0078849 A1 | 4/2007 | Slothouber |
| 2007/0083437 A1 | 4/2007 | Hamor |
| 2007/0094597 A1 | 4/2007 | Rostom |
| 2007/0100803 A1 | 5/2007 | Cava |
| 2007/0130090 A1 | 6/2007 | Staib et al. |
| 2007/0160345 A1 | 7/2007 | Sakai et al. |
| 2007/0162379 A1 | 7/2007 | Skinner |
| 2007/0174108 A1 | 7/2007 | Monster |
| 2007/0192168 A1 | 8/2007 | Van Luchene |
| 2007/0192181 A1 | 8/2007 | Asdourian |
| 2007/0206606 A1 | 9/2007 | Coleman et al. |
| 2007/0214048 A1 | 9/2007 | Chan et al. |
| 2007/0226679 A1 | 9/2007 | Jayamohan et al. |
| 2007/0233565 A1 | 10/2007 | Herzog et al. |
| 2007/0239534 A1 | 10/2007 | Liu et al. |
| 2007/0245013 A1 | 10/2007 | Saraswathy et al. |
| 2007/0260520 A1 | 11/2007 | Jha et al. |
| 2007/0282666 A1 | 12/2007 | Afeyan et al. |
| 2007/0288298 A1 | 12/2007 | Gutierrez |
| 2007/0299743 A1 | 12/2007 | Staib et al. |
| 2008/0015938 A1 | 1/2008 | Haddad et al. |
| 2008/0021763 A1 | 1/2008 | Merchant |
| 2008/0052152 A1 | 2/2008 | Yufik |
| 2008/0071640 A1 | 3/2008 | Nguyen |
| 2008/0082394 A1 | 4/2008 | Floyd et al. |
| 2008/0103893 A1 | 5/2008 | Nagarajan et al. |
| 2008/0120342 A1 | 5/2008 | Reed |
| 2008/0126205 A1 | 5/2008 | Evans et al. |
| 2008/0126476 A1 | 5/2008 | Nicholas et al. |
| 2008/0133305 A1 | 6/2008 | Yates et al. |
| 2008/0140765 A1 | 6/2008 | Kelaita et al. |
| 2008/0162574 A1 | 7/2008 | Gilbert |
| 2008/0195476 A1 | 8/2008 | Marchese et al. |
| 2008/0201218 A1 | 8/2008 | Broder et al. |
| 2008/0215456 A1 | 9/2008 | West et al. |
| 2008/0288338 A1 | 11/2008 | Wiseman et al. |
| 2008/0294536 A1 | 11/2008 | Taylor et al. |
| 2008/0300909 A1 | 12/2008 | Rikhtverchik et al. |
| 2008/0301009 A1 | 12/2008 | Plaster et al. |
| 2008/0305869 A1 | 12/2008 | Konforty |
| 2008/0313010 A1 | 12/2008 | Jepson |
| 2009/0006190 A1 | 1/2009 | Lucash et al. |
| 2009/0030755 A1 | 1/2009 | Altberg et al. |
| 2009/0030775 A1 | 1/2009 | Vieri |
| 2009/0037355 A1* | 2/2009 | Brave ................ G06F 16/9535 706/45 |
| 2009/0106080 A1 | 4/2009 | Carrier et al. |
| 2009/0106127 A1 | 4/2009 | Purdy et al. |
| 2009/0119167 A1 | 5/2009 | Kendall et al. |
| 2009/0157537 A1 | 6/2009 | Miller |
| 2009/0164323 A1 | 6/2009 | Byrne |
| 2009/0182589 A1 | 7/2009 | Kendall et al. |
| 2009/0204848 A1 | 8/2009 | Kube et al. |
| 2009/0222348 A1 | 9/2009 | Ransom et al. |
| 2009/0222737 A1 | 9/2009 | Liesche |
| 2009/0234722 A1 | 9/2009 | Evevsky |

(56) References Cited

U.S. PATENT DOCUMENTS

| | | |
|---|---|---|
| 2009/0240582 A1 | 9/2009 | Sheldon-Neal et al. |
| 2009/0276284 A1 | 11/2009 | Yost |
| 2009/0276305 A1 | 11/2009 | Clopp |
| 2009/0292677 A1 | 11/2009 | Kim |
| 2009/0293019 A1 | 11/2009 | Raffel et al. |
| 2009/0313173 A1 | 12/2009 | Singh |
| 2010/0042684 A1 | 2/2010 | Broms et al. |
| 2010/0070448 A1 | 3/2010 | Omoigui |
| 2010/0076816 A1 | 3/2010 | Phillips |
| 2010/0076851 A1 | 3/2010 | Jewell, Jr. |
| 2010/0146413 A1 | 3/2010 | Phillips |
| 2010/0094673 A1 | 4/2010 | Lobo et al. |
| 2010/0107123 A1 | 4/2010 | Sareen |
| 2010/0145831 A1 | 6/2010 | Esfandiari et al. |
| 2010/0228617 A1 | 9/2010 | Ransom et al. |
| 2011/0010656 A1 | 1/2011 | Mokotov |
| 2011/0055054 A1 | 3/2011 | Glasson |
| 2011/0060621 A1 | 3/2011 | Weller et al. |
| 2011/0103699 A1 | 5/2011 | Ke et al. |
| 2011/0131253 A1 | 6/2011 | Peukert et al. |
| 2011/0145226 A1* | 6/2011 | Gollapudi .......... G06F 16/9535 707/723 |
| 2011/0153383 A1 | 6/2011 | Bhattacharjya et al. |
| 2011/0153663 A1 | 6/2011 | Koren et al. |
| 2011/0173076 A1 | 7/2011 | Eggleston |
| 2011/0191319 A1 | 8/2011 | Nie et al. |
| 2011/0196802 A1 | 8/2011 | Ellis et al. |
| 2011/0225050 A1 | 9/2011 | Varghese |
| 2011/0231226 A1 | 9/2011 | Solden |
| 2011/0231383 A1 | 9/2011 | Smyth et al. |
| 2011/0271204 A1 | 11/2011 | Jones et al. |
| 2011/0276513 A1 | 11/2011 | Erhart et al. |
| 2011/0289068 A1* | 11/2011 | Teevan ................ G06F 16/9535 707/709 |
| 2012/0005187 A1 | 1/2012 | Chavanne |
| 2012/0030067 A1 | 2/2012 | Pothukuchi et al. |
| 2012/0084135 A1 | 4/2012 | Nissan et al. |
| 2012/0158715 A1 | 6/2012 | Maghoul et al. |
| 2012/0164619 A1 | 6/2012 | Meer |
| 2012/0166299 A1 | 6/2012 | Feinstein et al. |
| 2012/0231424 A1 | 9/2012 | Calman et al. |
| 2012/0233312 A1 | 9/2012 | Ramakumar et al. |
| 2012/0278388 A1 | 11/2012 | Kleinbart et al. |
| 2012/0284336 A1 | 11/2012 | Schmeidt et al. |
| 2013/0031470 A1 | 1/2013 | Daly, Jr. et al. |
| 2013/0073392 A1 | 3/2013 | Allen et al. |
| 2013/0080200 A1 | 3/2013 | Connolly et al. |
| 2013/0080426 A1 | 3/2013 | Chen et al. |
| 2013/0085893 A1 | 4/2013 | Bhardwaj et al. |
| 2013/0144870 A1 | 6/2013 | Gupta et al. |
| 2013/0145254 A1 | 6/2013 | Masuko et al. |
| 2013/0151331 A1 | 6/2013 | Avner et al. |
| 2013/0151388 A1 | 6/2013 | Falkenborg |
| 2013/0185164 A1 | 7/2013 | Pottjegort |
| 2013/0191409 A1 | 7/2013 | Zeng |
| 2013/0254059 A1 | 9/2013 | Teo |
| 2013/0268561 A1 | 10/2013 | Christie et al. |
| 2014/0019313 A1 | 1/2014 | Hu et al. |
| 2014/0025509 A1 | 1/2014 | Reisz et al. |
| 2014/0032544 A1 | 1/2014 | Mathieu et al. |
| 2014/0114680 A1 | 4/2014 | Mills et al. |
| 2014/0136290 A1 | 5/2014 | Schiestl et al. |
| 2014/0172652 A1 | 6/2014 | Pobbathi et al. |
| 2014/0180758 A1 | 6/2014 | Agarwal |
| 2014/0200959 A1 | 7/2014 | Sarb et al. |
| 2014/0259056 A1 | 9/2014 | Grusd |
| 2014/0289005 A1 | 9/2014 | Laing et al. |
| 2014/0337090 A1 | 11/2014 | Tavares |
| 2014/0372415 A1 | 12/2014 | Fernandez-Ruiz |
| 2015/0019958 A1 | 1/2015 | Ying et al. |
| 2015/0286742 A1 | 10/2015 | Zhang et al. |
| 2015/0287066 A1 | 10/2015 | Wortley et al. |
| 2017/0344622 A1 | 11/2017 | Islam et al. |
| 2020/0065357 A1 | 2/2020 | Noursalehi et al. |

FOREIGN PATENT DOCUMENTS

| | | |
|---|---|---|
| EP | 0636993 | 4/1999 |
| EP | 0807891 | 5/2000 |
| EP | 1241603 | 3/2001 |
| GB | 2397400 | 7/2004 |
| GB | 2424098 | 9/2006 |
| JP | 2001283083 | 10/2001 |
| JP | 2002318935 | 10/2002 |
| JP | 2009505238 | 2/2009 |
| WO | 97/17663 | 5/1997 |
| WO | 98/47082 | 10/1998 |
| WO | 98/49641 | 11/1998 |
| WO | 99/59283 | 11/1999 |
| WO | 00/25218 | 5/2000 |
| WO | 01/09803 | 2/2001 |
| WO | 01/82135 | 11/2001 |
| WO | 2001/097099 | 12/2001 |
| WO | 2002/037234 | 11/2002 |
| WO | 2003/094080 | 11/2003 |
| WO | 2007021920 | 2/2007 |
| WO | WO2007021920 | 2/2007 |
| WO | 2012/093410 | 7/2012 |
| WO | WO2015116038 | 8/2015 |
| WO | WO2015176071 | 11/2015 |

OTHER PUBLICATIONS

Y. K. Choi and S. K. Kim, "An auxiliary recommendation system for repetitively purchasing items in E-commerce," 2014 International Conference on Big Data and Smart Computing (BIGCOMP), Bangkok, 2014, pp. 96-98. (Year: 2014).*

S. Kulkarni, A. M. Sankpal, R. R. Mudholkarand Kirankumari, "Recommendation engine: Matching individual/group profiles for better shopping experience," 2013 15th International Conference on Advanced Computing Technologies (ICACT), Rajampet, 2013, pp. 1-6. (Year: 2013).*

Haibin Liu, Vlado Kešelj, "Combined mining of Web server logs and web contents for classifying user navigation patterns and predicting users' future requests," Data & Knowledge Engineering, vol. 61, Issue 2, 2007, pp. 304-330 (Year: 2007).*

Sumathi et. al., "Automatic Recommendation of Web Pages in Web Usage Mining," International Journal on Computer Science and Engineering, vol. 02, No. 09, 2010 (Year: 2010).*

2Roam, Inc., multiple archived pages of www.2roam.com retrieved via Internet Archive Wayback Machine on Jun. 10, 2008.

Alt et al., "Bibliography on Electronic Commerce," Electronic Markets—The International Journal, Oct. 1993, 5 pages, vol. 3, No. 3.

Alt et al., "Computer Integrated Logistics," Electronic Markets—The International Journal, Oct. 1993, 1 page, vol. 1, No. 3.

Anonymous, Image manipulation (image-editing software and image-manipulation systems)(Seybold Special Report, Part II), Seybold Reporton Publishing Systems, May 15, 1995, p. S35(9), vol. 24, No. 18.

Auctionwatch.Com, multiple pages—including search results for "expedition," printed Apr. 21, 2011.

Ball et al., "Supply chain infrastructures: system integration and information sharing," ACM SIGMOD Record, 2002, vol. 31, No. 1, pp. 61-66.

Berger et al., "Random Ultipie-Access Communication and Group Testing," IEEE, 1984.

Braganza, "IS Resarch at Cranfield—A Look at the Future," Electronic Markets—The International Journal, Oct. 1993, 1 page, vol. 3, No. 3.

Brecht et al., "The IM 2000 Research Programme," Electronic Markets—The International Journal, Oct. 1993, 1 page, vol. 3, No. 3.

Business Wire business/technology editors, "Sellers Flock to OutletZoo. com as New Automatic Price Drop Method Moves Excess Inventory Online," Business Wire, Oct. 25, 1999.

Business Wire business editors/high-tech writers, "PictureWorks Technology, Inc. Expands in Real Estate Market Vvith Adoption of Rimfire on REALTOR.com," Business Wire, Nov. 8, 1999.

(56) References Cited

OTHER PUBLICATIONS

Business Wire business editors/high-tech writers, "PictureWorks Technology, Inc. Shows Strong Revenue Growth in Internet Imaging Business," Business Wire, Nov. 10, 1999.
Business Wire business editors/high-tech writers, "2Roam Partners with Pumatech to Delivery Wireless Alerts," Business Wire, Dec. 18, 2000.
Business Wire business editors/high-tech writers, "2Roam Takes eHow's How-to Solutions Wireless: With 2Roam, the Web's One-Stop Source for getting Things Done is on More Wireless Devices, with Ability to Purchase Its Products from Anywhere," Business Wire, Oct. 2, 2000.
Business Wire business editors/high-tech writers, "2Roam Drives Hertz to the Wireless Web: Number One Car Rental Company to Provide Customers Wireless Access from Any Device," Business Wire, Aug. 7, 2001.
BUY.COM, www.buy.com homepage, printed Oct. 13, 2004.
Chen et al., "Detecting Web Page Structure for Adaptive Viewing on Small Form Factor Devices," ACM, May 20-24, 2003.
Clemons et al., "Evaluating the prospects for alternative electronic securities markets," Proceedings of the twelfth international conference on information systems, New York, New York, United States, pp. 53-64, 1991.
FRIENDSTER.COM, homepage and "more info" pages, printed Apr. 29, 2004.
GOOGLE News archive search for "2Roam marketing" performed over the date range 2000-2003.
GOOGLE News archive search for "2Roam SMS" performed over the date range 2000-2008.
Grabowski et al., "Mobile-enabled grid middleware and/or grid gateways," GridLab—A Grid Application Toolkit and Testbed, Work Package 12—Access for Mobile Users, Jun. 3, 2003.
Graham, "The Emergence of Linked Fish Markets in Europe," Electronic Markets—The International Journal, Jul. 1993, 4 pages, vol. 8, No. 2.
Gunthorpe et al., "Portfolio Composition and the Investment Horizon," Financial Analysts Journal, Jan.-Feb. 1994, pp. 51-56.
Halperin, "Toward a Process Handbook for Organizational Coordination Processes," Electronic Markets—The International Journal, Oct. 1993, 1 page, vol. 3, No. 3.
Hess et al., "Computerized Loan Origination Systems: An Industry Case Study of the Electronic Markets Hypothesis," MIS Quarterly, Sep. 1994, pp. 251-275.
IBM, "Anyonymous Delivery of Goods in Electronic Commerce," IBM Technical Disclosure Bulletin, Mar. 1996, pp. 363-366, vol. 39, No. 3.
IBM, "Personal Optimized Decision/Transaction Program," IBM Technical Disclosure Bulletin, Jan. 1995, pp. 83-84, vol. 38, No. 1.
Icrossing, "Icrossing Search Synergy: Natural & Paid Search Symbiosis," Mar. 2007.
IEEE 100—The Authoritative Dictionary of IEEE Standard Terms, Seventh Edition, 2000. Entire book cited; table of contents, source list, and terms beginning with A included. ISBN 0-7381-2601-2.
Ives et al., "Editor's Comments—MISQ Central: Creating a New Intellectual Infrastructure," MIS Quarterly, Sep. 1994, p. xxxv.
Joshi, "Information visibility and its effect on supply chain dynamics," Ph.D. dissertation, Massachusetts Institute of Technology, 2000 (fig. 4.5; p. 45).
Klein, "Information Logistics," Electronic Markets—The International Journal, Oct. 1993, pp. 11-12, vol. 3, No. 3.
Klein, "Introduction to Electronic Auctions," Electronic Markets—The International Journal, Dec. 1997, 4 pages, vol. 7, No. 4.
Kubicek, "The Organization Gap," Electronic Markets—The International Journal, Oct. 1993, 1 page, vol. 3, No. 3.
Kuula, "Telematic Services in Finland," Electronic Markets—The International Journal, Oct. 1993, 1 page, vol. 3, No. 3.
Lalonde, "The EDI World Institute: An International Approach," Electronic Markets—The International Journal, Oct. 1993, 1 page, vol. 3, No. 3.

Lee et al., "Intelligent Electronic Trading for Commodity Exchanges," Electronic Markets—The International Journal, Oct. 1993, 2 pages, vol. 3, No. 3.
Lee et al., "Electronic Brokerage and Electronic Auction: The Impact of IT on Market Structures," Proceedings of the 29th Annual Hawaii International Conference on System Sciences, 1996, pp. 397-406.
Lee, "AUCNET: Electronic Intermediary for Used-Car Transactions," Electronic Market—The International Journal, Dec. 1997, pp. 24-28, vol. 7, No. 4.
LIVE365 press release, "Live365 to Offer Opt-In Advertising on Its Website," Oct. 15, 2004.
London Business School, "Overture and Google: Internet Pay-Per-Click (PPC) Advertising Options," Mar. 2003.
M2 Presswire, "Palm, Inc.: Palm unveils new web browser optimised for handhelds; HTML browser offers high-speed web-browsing option," Mar. 13, 2002.
Malone et al., "Electronic Markets and Electronic Hierarchies," Communications of the ACM, Jun. 1987, pp. 484-497, vol. 30, No. 6.
Mansell et al., "Electronic Trading Networks: The Route to Competitive Advantage?" Electronic Markets—The International Journal, Oct. 1993, 1 page, vol. 3, No. 3.
Mardesich, "Onsale takes auction gavel electronic," Computer Reseller News, Jul. 8, 1996, pp. 2, 32.
Marteau, "Shop with One Click, Anywhere, Anytime," Information Management and Consulting, 2000, pp. 44-46, vol. 15, No. 4.
Massimb et al., "Electronic Trading, Market Structure and Liquidity," Financial Analysts Journal, Jan.-Feb. 1994, pp. 39-49.
McGinnity, "Build Your Weapon," PC Magazine, Apr. 24, 2001, printed from www.pcmag.com/print_article2?0,1217, a%253D3955,00. asp.
Meade, "Visual 360: a performance appraisal system that's 'fun,'" HR Magazine, 44, 7, 118(3), Jul. 1999.
"MEDIAPPRAISE: Mediappraise Receives National Award for Web-Based Technology That Enables Companies to Solve Thorny HR Problem," Dec. 14, 1998.
Medvinsky et al., "Electronic Currency for the Internet," Electronic Markets—The International Journal, Oct. 1993, 2 pages, vol. 3, No. 3.
Metails.com, www.metails.com homepage, printed Oct. 13, 2004.
Microsoft Computer Dictionary, Fifth Edition, front matter and p. 33.
Microsoft Computer Dictionary, Fifth Edition, front matter, back matter, and pp. 479, 486.
Neches, "Fast—A Research Project in Electronic Commerce," Electronic Markets—The International Journal, Oct. 1993, 4 pages, vol. 3., No. 3.
Neo, "The implementation of an electronic market for pig trading in Singapore," Journal of Strategic Information Systems, Dec. 1992, pp. 278-288, vol. 1, No. 5.
O'Mahony, "An X.500-based Product Catalogue," Electronic Markets—The International Journal, Oct. 1993, 2 pages, vol. 3, No. 3.
"Onsale: Onsale Brings Thrill of Auctions and Bargain Hunting Online: Unique Internet retail services debuts with week-long charity auction for The Computer Museum in Boston," May 24, 1995, printed from www.dialogweb.com/cgi/dwclient?dwcommand,DWEBPRINT%20810-489267.
"ONSALE joins fray as online shopping pcks up speed: Internet Booms," Comptuer Reseller News, Jun. 5, 1995.
Palm, Inc., PalmTM Web Pro Handbook, copyright 2002-2003.
Post et al., "Application of Auctions as a Pricing Mechanism for the Interchange of Electric Power," IEEE Transactions of Power Systems, Aug. 1995, pp. 1580-1584, vol. 10, No. 3.
Preist et al., "Adaptive agents in a persistent shout double auction," International Conference on Information and Computation, Proceedings of the first international conference on information and computation economies, Oct. 25-28, 1998, Charleston, United States, pp. 11-18.
Qualcomm, "Brew Developer Support," printed from web.archive. org/web/20020209194207/http://www.qualcomm.com/brew/developer/support/kb/52.html on Aug. 30, 2007.

(56) References Cited

OTHER PUBLICATIONS

RCR Wireless News, "Lockheed Martin to use 2Roam's technology for wireless platform," RCR Wireless News, Sep. 10, 2001.
Reck, "Formally Specifying an Automated Trade Execution System," J. Systems Software, 1993, pp. 245-252, vol. 21.
Reck, "Trading-Process Characteristics of Electronic Auctions," Electronic Markets—The International Journal, Dec. 1997, pp. 17-23, vol. 7, No. 4.
REPCHECK.COM, www.repcheck.com homepage, printed from web.archive.org/web/20020330183132/http://epcheck.com on Sep. 5, 2009.
Resnick et al., "Reputation Systems," Communications of the ACM, Dec. 2000, pp. 45-48, vol. 43, No. 12.
Rockoff et al., "Design of an Internet-based system for remote Dutch auctions," Internet Research: Electronic Networking Applications and Policy, 1995, pp. 10-16, vol. 5, No. 4.
Rose, "Vendors strive to undo Adobe lock-hold," Computer Reseller News, Feb. 5, 1996, n 66669, p. 71(7).
Rysavy, "Mobile-commerce ASPs do the legwork," Network Computing, Jan. 22, 2001, p. 71, 6 pgs., vol. 12, No. 2.
Saunders, "AdFlight to Offer WAP Ads," Oct. 17, 2000, printed from clickz.com/487531/print.
Schmid, "Electronic Markets," Electronic Markets—The International Journal, Oct. 1993, 2 pages, vol. 3, No. 3.
Schwankert, "Matsushita Taps 2Roam for Wireless Solutions," www.internetnews.com/bus-news.article.php/674811, Feb. 2, 2001.
Sen, "Inventory and Pricing Models for Perishable Products," Doctor of Philosophy Dissertation—University of Southern California, Aug. 2000.
Siegmann, "Nowhere to go but up," PC Week, Oct. 23, 1995, 3 pages, vol. 12, No. 42.
Telephony Staff, "Air-ASP," Telephony Online, Oct. 2, 2000, 3 pages.
Teo, "Organizational Factors of Success in Using EDIS: A Survey of Tradenet Participants," Electronic Markets—The International Journal, Oct. 1993, 2 pages, vol. 3, No. 3.
Tjostheim et al., "A case study of an on-line auction for the World Wide Web," printed from www.nr.no/gem/elcom/puplikasjoner/enter98e.html on Jun. 10, 1990, 10 pages.
Turban, "Auctions and Bidding on the Internet: An Assessment," Electronic Markets—The International Journal, Dec. 1997, 5 pages, vol. 7, No. 4.
Ubid.Com, "How do 1 Updated my Address, Phone, Credit Card, Password, etc ?" printed from web.archive.org/web/20010208113903/www.ubid.com/help/topic13asp on Aug. 30, 2007.
Ubid.Com, "How do I track my shipment?" printed from web.archive.org/web/20010331032659/www.ubid.com/help/topic27.asp on Aug. 30, 2007.
Ubid.Com, "Can I track all of my bids from My Page?" printed from web.archive.org/web/20010208114049/www.ubid.com/help/topic14.asp on Aug. 30, 2007.
Van Heck et al., "Experiences with Electronic Auctions in the Dutch Flower Industry," Electronic Markets—The International Journal, Dec. 1997, 6 pages, vol. 7, No. 4.
Verizon Wireless, "Verizon Wireless Customers Get It NowSM; Get Games, Get Pix, Get Ring Tones and Get Going in Full Color," press release to PRNEWSWIRE, Sep. 23, 2002.
Warbelow et al., "AUCNET: TV Auction Network System," Harvard Business School 9-190-001, Jul. 19, 1989, Rev. Apr. 12, 1996, pp. 1-15.
Weber, "How Financial Markets are Going On-line," Electronic Markets—The International Journal, Oct. 1993, 2 pages, vol. 3, No. 3.
Wireless Internet, "DailyShopper Selects 2Roam to Enable Mobile Customers to Retrieve Nearby Sales and Promotions Information," Wireless Internet, Apr. 2001.
Wireless Week, "Verizon Wireless Gets Going on BREW Agenda," Wireless Week, Sep. 23, 2002.
Xchanger.Net, webpage printed from www.auctiva.com/showcases/as_4sale.asp?uid=exchanger, undated but at least as early as Oct. 12, 2000.
Yu et al., "Distributed Reputation Management for Electronic Commerce," Computational Intelligence, 2002, pp. 535-549, vol. 18, No. 4.
Zetmeir, Auction Incentive Marketing, print of all pages of website found at home.earthlink.net/~bidpointz/ made Oct. 8, 2004.
Zimmermann, "Integration of Financial Services: The TeleCounter," Electronic Markets—The International Journal, Oct. 1993, 1 page, vol. 3, No. 3.
Zwass, "Electronic Commerce: Structures and Issues," International Journal of Electronic Commerce, Fall 1996, pp. 3-23, vol. 1, No. 1.
Chen, M. (2007), Knowledge assisted data management and retrieval in multimedia database systems (Order No. 3268643).
Fan, J., Keim, F.A., Gao, Y., Luo, H. and Li, Z. (2009). JustClick: Personalized Image Recommendation via Exploratory Search from Large-Scale Flickr Images. Feb. 2009. IEEE Transactions on Circuits and Systems for Video.
Rodriguez, Camille, HootSuite vs. social Oomph vs. Tweekdeck, Jan. 4, 2012, http://polkadotimpressions.com/2012/01/04/hootsuite-vs-social-oopmphvs.tweetdeck/ (Year: 2012).
Schaffer, Neil, The Top 20 Twitter clients—HootSuite, TweetDeck and More, Jan. 31, 2012, https://maximizesocialbusinss.com/top-20-twitter-clients-2012-9175/ (Year: 2012).
Levy, Michael, and Dhruv Grewal. "Supply chain management in a networked economy." Journal Retailing 76.4 (2000): 415-429.
Neisser, "Which is better for Social Media Monitoring: TweetDeck or SproutSocial" Mar. 17, 2011, Social Media Examiner, https://www.socialmediaexaminer.com/which-is-better-for-social-media-monitoring-tweetdeck-or-sproutsocial/.
Ross, David Frederick, Frederick S. Weston, and W. Stephen. Introduction to supply chain management technologies. CRC Press, 2010.
Message Passing from Wikipedia, archived May 6, 2016, retrieved from https://en.wikipedia.org/wiki/message_passing, 4 pages.
Di et al., "A New Implementation for Ontology Mapping Based enterprise Semantic Interoperation," by Xiaofeng Di and Yushun Fan, Applied Mechanics and Materials, vols. 16-19 (2009), pp. 644-648 (Year:2009).
Nicolle et a., "XML Integration and Toolkit for B2B Applications," by Christophe Nicolle, Kokou Yetongnon, and Jean-Claude Simon, Journal of Database Management, Oct.-Dec. 2003 (Year: 2003).
V. Aksakalli, Optimizing direct response in Internet display advertising, Elsevier, vol. 11, Issue 3, May-Jun. 2012, pp. 229-240. (Year: 2012).
Gallagher et al. A framework for targeting banner advertising on the internet. IEEE, pp. 265-274 (Year: 1997).

\* cited by examiner

LOCALIZED SORT OF RANKED PRODUCT RECOMMENDATIONS BASED ON PREDICTED USER INTENT

CROSS-REFERENCE TO RELATED APPLICATIONS

This application is a continuation-in-part of U.S. patent application Ser. No. 14/213,755, filed Mar. 14, 2014, which claims the benefit of U.S. Provisional Application No. 61/798,502, filed Mar. 15, 2013, both of which are hereby incorporated by reference herein in their entireties, including but not limited to those portions that specifically appear hereinafter, the incorporation by reference being made with the following exception: In the event that any portions of the above-referenced applications are inconsistent with this application, this application supercedes the above-referenced applications.

STATEMENT REGARDING FEDERALLY SPONSORED RESEARCH OR DEVELOPMENT

Not Applicable.

BACKGROUND

1. The Field of the Present Disclosure

The present disclosure relates generally to electronic commerce ("e-commerce"), and more particularly, but not necessarily entirely, to systems and methods for making product recommendations to online users.

2. Description of Related Art

Since the early days of mail cataloging, retail has used sales data to best order the products in catalogs. The method consists of taking a sales metric like the total purchase count of each product and using it to generate a rank of most popular to least popular. The rank is then used to order the products in the catalog. Likewise, online search results may be ranked according to product popularity. For example, products matching a search criterion entered by a user may be presented in the search results using a ranked product list. The most popular products in the search results may be listed higher in the ranked list than less popular products.

One shortcoming to ranking returned search results according to user popularity is that the search results may list undesirable products high in the ranking from the perspective of the user conducting the search. This typically occurs because the search ranking algorithms do not take into account the intent of the user conducting the search. It would therefore be an improvement over the prior art to exclude undesirable products, from the user's perspective, from the search result rankings, even though those products may have a high popularity.

The prior art is thus characterized by several disadvantages that are addressed by the present disclosure. The present disclosure minimizes, and in some aspects eliminates, the above-mentioned failures, and other problems, by utilizing the methods and structural features described herein.

The features and advantages of the present disclosure will be set forth in the description that follows, and in part will be apparent from the description, or may be learned by the practice of the present disclosure without undue experimentation. The features and advantages of the present disclosure may be realized and obtained by means of the instruments and combinations particularly pointed out in the appended claims.

BRIEF DESCRIPTION OF THE DRAWINGS

The features and advantages of the disclosure will become apparent from a consideration of the subsequent detailed description presented in connection with the accompanying drawings in which.

DETAILED DESCRIPTION

Figure 1:
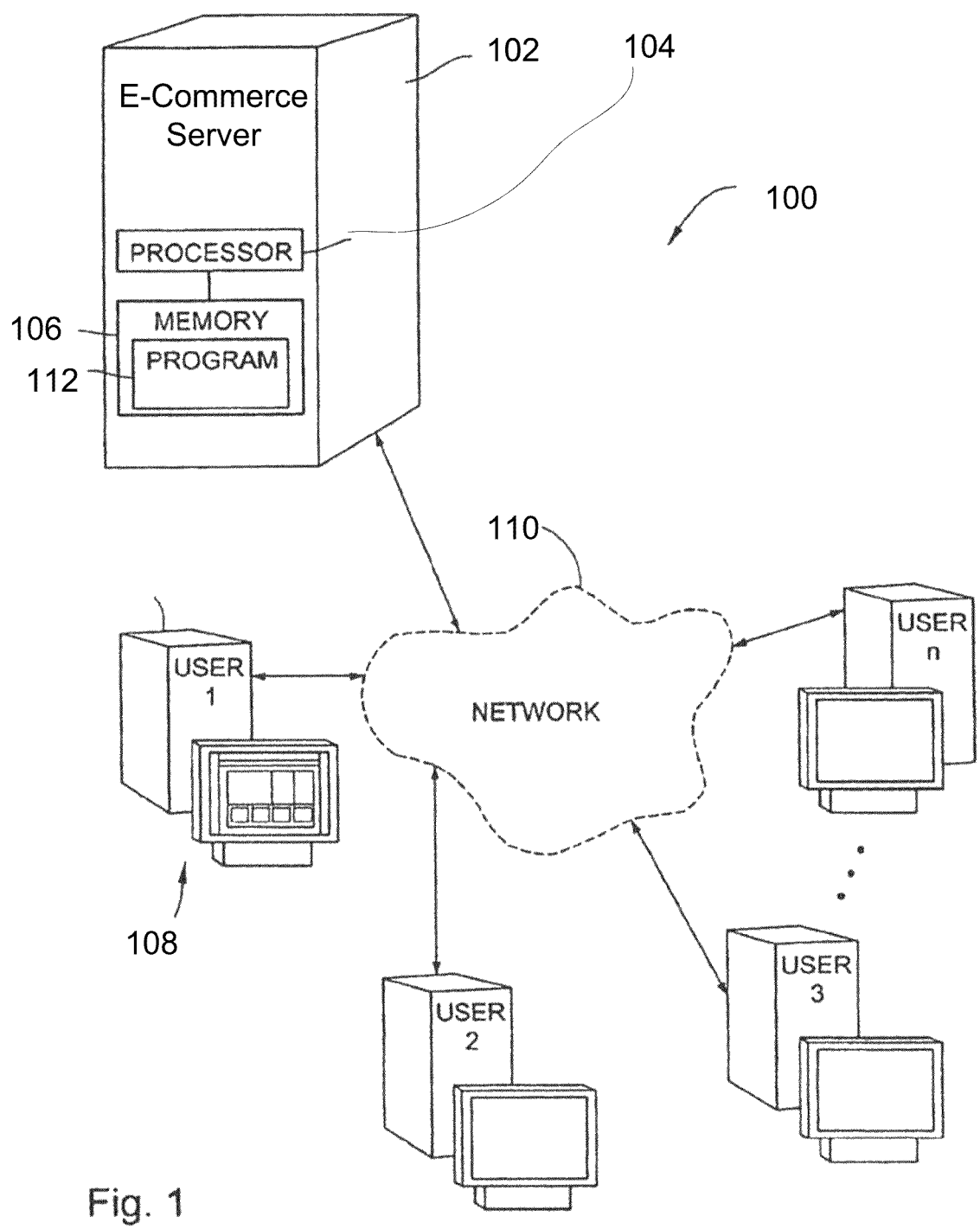
FIG. 1 is a block diagram of a product recommendation system according to an illustrative embodiment of the present disclosure.

For the purposes of promoting an understanding of the principles in accordance with the disclosure, reference will now be made to the embodiments illustrated in the drawings and specific language will be used to describe them. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

In describing and claiming the present disclosure, the following terminology will be used in accordance with the definitions set out below. As used in this specification and the appended claims, the singular forms "a," "an," and "the" include plural referents unless the context clearly dictates otherwise. As used in this specification and the appended claims, the terms "comprising," "including," "containing," "having," "characterized by," and grammatical equivalents thereof are inclusive or open-ended terms that do not exclude additional, unrecited elements or method steps.

In an illustrative embodiment, the present disclosure provides systems and processes for re-ordering a set of ranked search results based on a user's predicted intent. For example, in one or more embodiments, a search query may be defined by a targeted user through a search engine interface provided in a web browser running on a user device. In response to the search query, the search engine may generate search results in the form of a ranked search results list. The ranking of the search results list may be based on popularity. Prior to displaying the search results to the targeted user, the present disclosure may locally sort or re-order the ranked search results list based on the targeted user's predicted intent. The locally sorted search results list is then displayed to the targeted user on the user device, such as on an electronic display of the user device. In this manner, the list may be tailored to the targeted user and may result in a higher conversion rate, i.e., product sale. The targeted user may then select one of the items in the list using a selection feature provided on the user computer. The targeted user may complete a check-out procedure to purchase the selected item from the list.

In an illustrative embodiment, the search engine that generates the ranked search results may be a "web search engine." As is known to those of ordinary skill, a web search engine is a software system running on a server that is designed to search for information on the World Wide Web. A web search engine may be hosted on a website that provides a search interface. Examples of popular web search engines include Google, Yahoo, Dogpile, and Bing. The search results are generally presented in a ranked list of results based on proprietary algorithms. The ranked search results may include a mix of web pages, images, and other types of files. Search engines also maintain real-time information by running an algorithm on a web crawler.

In an illustrative embodiment, the search engine is a "website search engine." As is known to those of ordinary skill in the relevant art, a website search engine that generates search results is a software system running on a server that is designed to search for information on a particular website. That is, many websites offer their own internal search engine that allows users to search only the websites for items of interest. Websites may provide a search engine interface for their internal search engine on the pages of the website. The websites providing the internal search engine feature may be e-commerce websites—i.e., websites that offer products for sale online.

In an illustrative embodiment, the present disclosure determines a targeted user's predicted intent from the targeted user's tracked online behavior. In this regard, the present disclosure provides a tracking feature to track the targeted user's online behavior. The target user's online behavior may include a wide range of actions taken online by the target user through a web browser interface, including but not limited to: search terms entered by the user in search engine interfaces, paths selected by the user through a product hierarchy for a website, previous promotions selected by the user, web pages viewed by the user, product pages viewed by the user, product attributes selected by the user, search refinements selected by the user, search refinements entered by the user, the user's website interactions, related products viewed by the user, browsing history, the user's profile, and recent purchases made by the user, and any other online interactions of the user with a website or websites.

In an illustrative embodiment, the present disclosure provides a computer server that is operable to track users' online interactions with websites. For example, the computer server may track a targeted user's website interactions used to locate a product or group of products on the website. The computer server may track a wide range of website interactions taken online by the targeted user, including but not limited to: search terms entered by the user in a search engine interface provided on the website, a path selected by the user through a graphical product hierarchy provided on the website, previous promotions selected by the user on the website, web pages viewed by the user on the website, product pages viewed by the user on the website, product attributes selected by the user, search refinements selected by the user, search refinements entered by the user, the user's website interaction, related products viewed by a user, browsing history, user profile, and recent purchases.

In an illustrative embodiment, the present disclosure provides a computer server that is operable to perform a localized sort of ranked products based on users' online interactions. In particular, the user may perform a request on a website that returns a ranked product list. The ranked product list may include products ranked in order of popularity. For example, the user may perform a search request on the website using search terms or clicking a refinement link. The computer server may generate a ranked product list, with the most popular or relevant product being at the top of the list and the least popular or relevant product being at the bottom of the list. Prior to presenting the ranked product list to the user, the computer server may perform a localized sort of the ranked product list based on the user's predicted intent.

In an illustrative embodiment, the computer server performs a localized sort of a ranked product list based on a target user's predicted intent. To determine the target user's predicted intent, the computer server matches tracked online interactions of the target user to past users' online interactions. For example, if past users with matching online interactions selected the third item in the ranked list, then the localized sort conducted by the computer server may place this item, the third item, at the top of the list actually presented to the targeted user using a localized sort. This is true even though the third item in the ranked product list is third in overall popularity. But, because of the tracked user online interactions, the localized sort conducted by the computer server places the third most popular item at the top of the product list actually presented to the target user.

In an illustrative embodiment, the computer server locally sorts ranked product lists based on predicted user intent by matching the target user's online interactions to the online interactions of past users. The ranked product list may be generated based on overall popularity on the website. For example, best-selling products on the website may be positioned at the top of the ranked list. The local sort may promote products above their position in the ranked product list and may demote products below their position in the ranked product list. In this manner, the present disclosure provides a customized product list to the targeted users based on the predicted intent of the target users.

In an illustrative embodiment, the computer server locally sorts ranked product lists based on predicted user intent by matching the target user's online refinement selections to the online refinement interactions of past users. Available online refinement selections may be presented on web pages of the website in the form of selectable icons. Online refinement selections may include product attributes, product uses, product categories, product sizes, product prices, product materials, or any other refinement selection that may be utilize to refine a group of products. The online product refinement selections may be selected by users through a selection feature provided on a website, such as a mouse and pointer that allows users to select graphical icons displayed on a web page. Online product refinements may also include search terms entered by users in a search engine interface provided on the website.

Referring now to FIG. 1, there is depicted a product recommendation system 100 for providing product recommendations to targeted users in an online environment according to an illustrative embodiment of the present disclosure. According to an illustrative embodiment, the product recommendation system 100 is positioned to provide product recommendations on an online website, sometimes referred to as an e-commerce website, to targeted users.

The system 100 includes an online retailer or wholesale services e-commerce server 102 that includes a processor 104 and memory 106. One or more user computers or devices 108 are positioned remotely from and in communication with the server 102 through an electronic communication network 110, such as the Internet or other computer network.

As understood by those skilled in the art, the memory 106 of the server 102 can include volatile and nonvolatile memory including, for example, RAM, ROM, and magnetic or optical disks, just to name a few. It should also be understood by those skilled in the art that although illustrated as a single server, the illustrated configuration of the server 102 is given by way of example and that other types of servers or computers configured according to various other methodologies known to those skilled in the art can be used.

The server 102 shown schematically in FIG. 1 represents a server or server cluster or server farm and is not limited to any individual physical server. The server site may be deployed as a server farm or server cluster managed by a server-hosting provider. The number of servers and their architecture and configuration may be increased based on usage, demand, and capacity requirements for the system 100. Similarly, the database servers (not shown) each represent a server or server cluster or server farm and are not limited to any individual physical server or configuration.

As also understood by those skilled in the art, user devices 108 may be a processer-based device, such as one of a laptop, desktop, personal digital assistants or PDAs, smart phones, cell phones, servers, computers, or other types of computers. Each of the user devices 108 is web-enabled, meaning that the user devices 108 may run a web browser for accessing websites over the network as is known to those of ordinary skill in the art.

In an illustrative embodiment, the server 102 includes an e-commerce program 112 stored in the memory 106. The e-commerce program 112 is operable to provide an e-commerce website on the network 110 that offers product for sale through online purchasers. In this regard, the program 112 may provide web pages for display on the user devices 108 in a web browser. The web pages may display product listings for products offered for sale on the website as is known to those of ordinary skill. The information for the product listings may be generated from a product database maintained on an electronic storage medium connected to the server 102. The product listings may include images and descriptive information about the products offered for sale on the e-commerce website. The product listings may also include pricing information and user reviews.

The products, or product listings, may be organized according to a product hierarchy defined in the database. The product hierarchy organizes the products offered for sale by product attributes as is known to those of ordinary skill in the art. Interactive links provided on the website may allow users to navigate the product hierarchy by narrowing or expanding a product search.

The e-commerce program 112 may further provide a search engine feature that allows users to locate desired products by formulating search queries. In an illustrative embodiment, the search engine may provide a search box that allows users to define search parameters by entering search terms. The search engine may conduct a search for product listings in the database based on the search terms. The search engine may generate a list of ranked search results. The ranked search results include the most popular or highest ranked product listings at the top of the list and the lower ranked product listings in descending order.

The e-commerce program 112 may further provide a tracking feature that is operable to track targeted users' online interactions with the system 100. The program 112 may cause the tracked movements of the targeted users to be stored in a database on an electronic storage medium in association with each user. For example, the tracked user movements may be stored under a unique ID, such as a cookie ID, associated with each user. In an illustrative embodiment, the tracked movements of the targeted users include, but are not limited to, search terms entered by the user in search engine interfaces, paths selected by the user through a product hierarchy for a website, previous promotions selected by the user, web pages viewed by the user, product pages viewed by the user, product attributes selected by the user, search refinements selected by the user, search refinements entered by the user, the user's website interactions, related products viewed by the user, browsing history, the user's profile, and recent purchases made by the user, and any other online interactions of the user with a website or websites.

Figure 2:
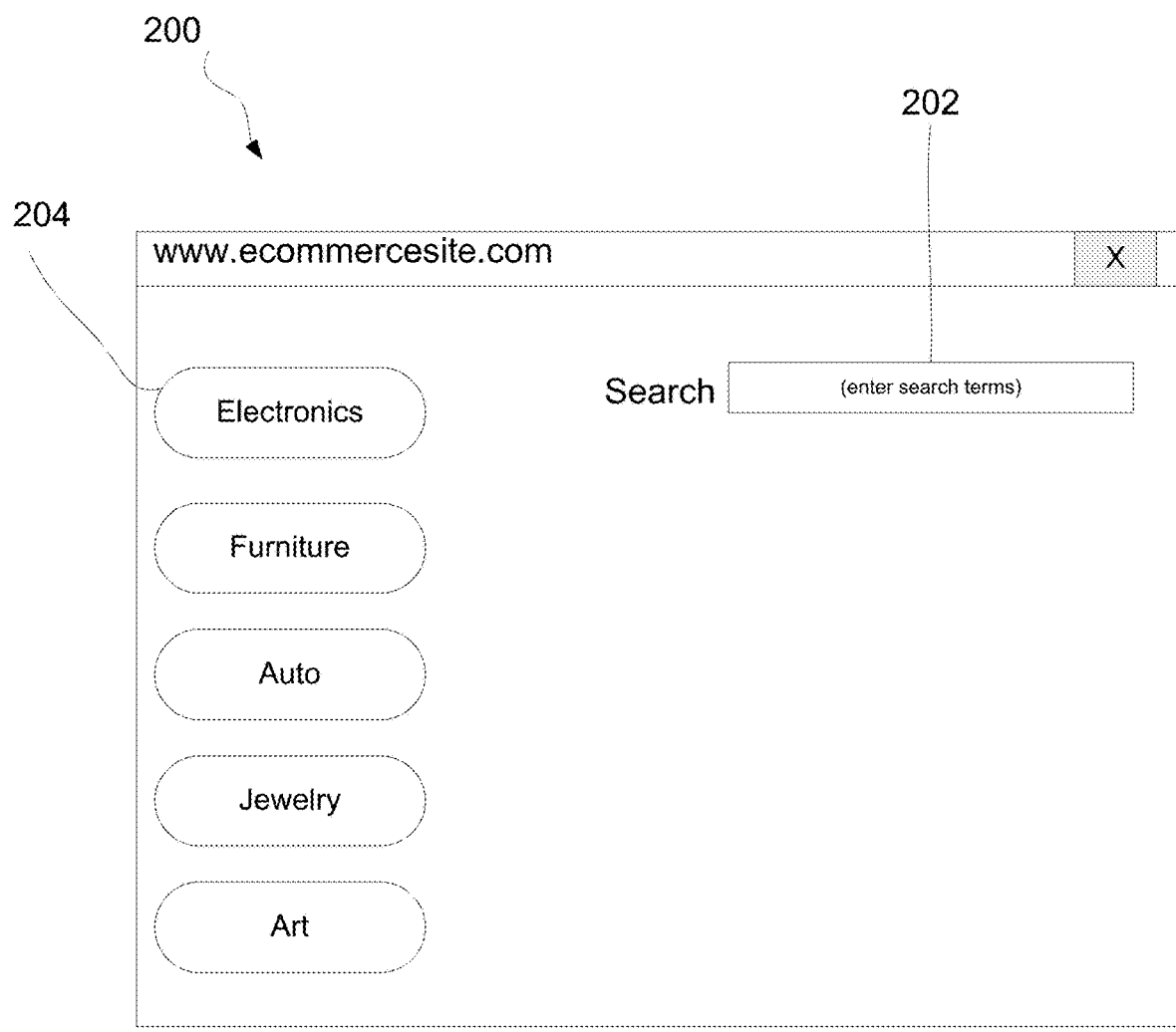
FIG. 2 is a representation of an exemplary webpage for display on a user device according to an illustrative embodiment of the present disclosure.

Referring now to FIG. 2, there is depicted a webpage 200 generated by the server 102 according to an illustrative embodiment of the present disclosure. The webpage 200 may be part of an e-commerce website hosted by the server 102. The webpage 200 is displayed on a user device 108 in response to a request. According to an illustrative embodiment, the webpage 200 may provide user tools or features that allow users to locate desirable products. In an illustrative embodiment, the webpage 200 may provide a search feature, including a search box 202. The search box 202 allow users to enter search terms to find desirable products. In an illustrative embodiment, the webpage 200 may also provide a searchable product hierarchy 204. The product hierarchy 204 may include groups of products categorized together by attributes. The searchable product hierarchy 204 may include user selectable links that launch a product hierarchy search. For example, the selectable links may include product descriptions, such as watches, electronics, toys, etc.

Once a user selects a link in the product hierarchy 204 or conducts a text search through the search box 202, the user may be able to further refine product selections by product attributes, referred to herein as product refinements. In an illustrative embodiment, product attributes may include size, color, functionality, purpose, price, quantity, manufacturer, brand, components, and features that affect the product's appeal or acceptance in the marketplace. Users may use the product hierarchy 204 and the search box 202 in combination, or separately, to find a product listing for a desired product.

Figure 3:
FIG. 3 depicts sorting a ranked product list based on a user's online interactions according to an illustrative embodiment of the present disclosure.

Referring now to FIG. 3, using the website features, the user may cause the program 112 to generate a preliminary list 300 of product listings. For purposes of this disclosure, the list 300 is depicted as having ten items, Product Listings A-J. It will be appreciated that the list 300 may have more or fewer items.

The Product Listings A-J in the list 300 are organized according to product rank such that the list is considered a ranked product list. In FIG. 3, Product Listing A is the top ranked while Product Listing J is the lowest ranked item in the list. The list ranking may be based on a popularity ranking, which may include, but is not limited to: best sellers, most viewed, best priced, etc. However, the list 300 is preliminary in the sense that the list is not organized specific to the user. Still referring to FIG. 3, the program 112 may re-sort the list 300 into list 302 based on the targeted user's tracked online behavior. It will be noted that re-sorted listed 302 is displayed on a webpage on a display of the user device 108 and not the list 300. In this regard, the operation of the program 112 to re-sort the list 300 into list 302 is invisible to the user.

Figure 4:
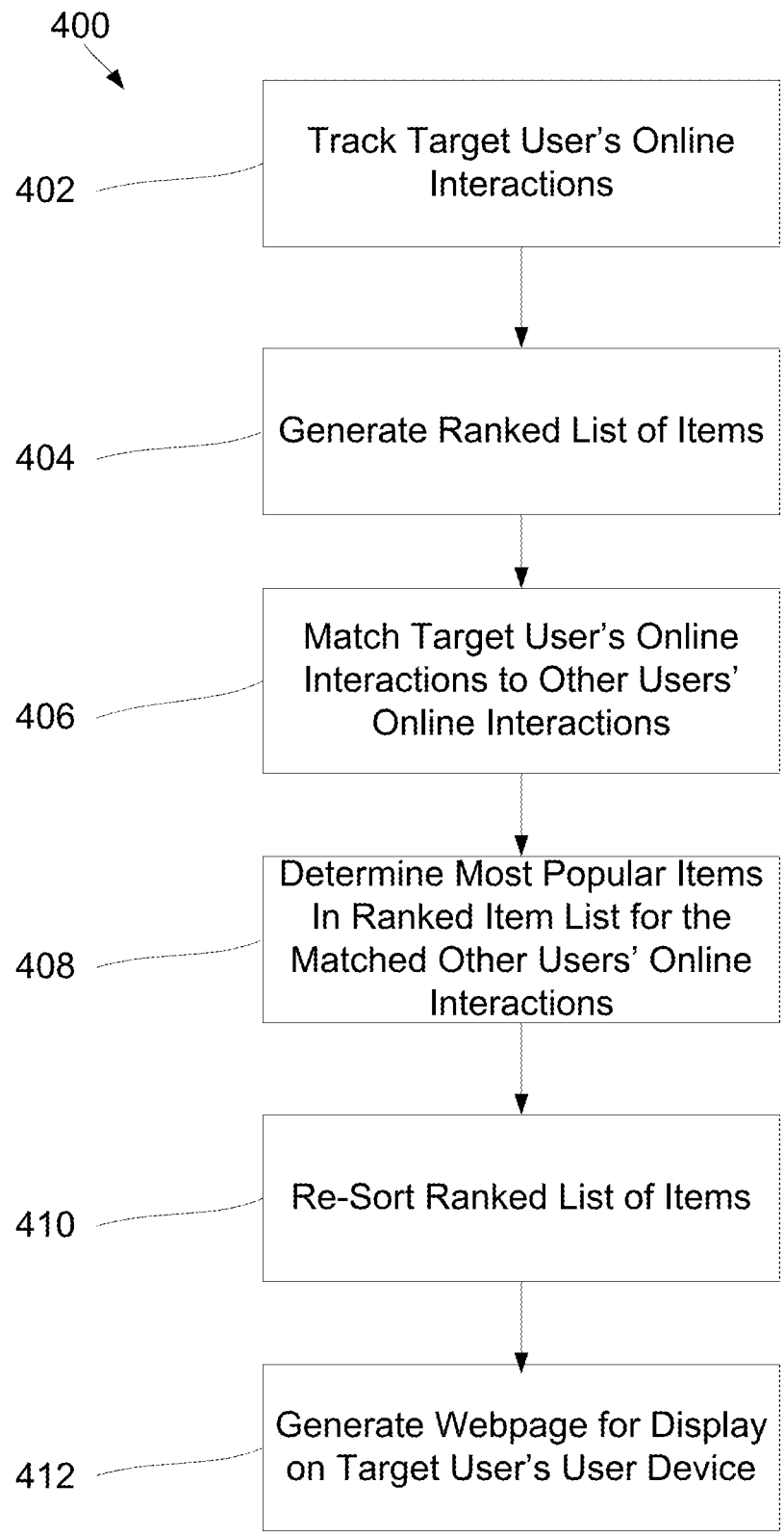
FIG. 4 is a flow diagram of a process for sorting a ranked product list based on a user's online interactions according to an illustrative embodiment of the present disclosure.

Referring now to FIG. 4, there is depicted a flow-diagram 400 of the steps taken by the program 112, when executed by the processor 104, to re-sort a ranked product list to form a sorted ranked product list. At step 402, the program 112 tracks a targeted user's online interactions. In an illustrative embodiment, the targeted user is an online visitor to an e-commerce website. This step may include tracking search terms entered by the user in search engine interfaces, paths selected by the user through a product hierarchy of a website, previous promotions selected and viewed by the user, web pages viewed by the user, product pages viewed by the user, product attributes selected by the user, search refinements selected by the user, search refinements entered by the user, the user's website interactions, related products viewed by the user, browsing history, the user's profile, and recent purchases made by the user, and any other online interactions of the user with a website or websites.

At step 404, the program 112 generates a ranked list of items, such as product listings, in response to a user's action on the website. The ranked list may be generated based on a search request formed by a user. The ranked list may be generated in response to the user selecting a link or icon on the website. The list may contain a ranked list of product listings as explained above. For example, the list of product listings may be ranked based on overall popularity on the website. The top item in the list may be the most popular item, i.e., the bestselling product.

At step 406, the program 112 matches the targeted user's tracked online behavior to the tracked online behavior of previous users who have requested the same or similar list on the website.

At step 408, the program 112 determines which of the items in the ranked list are most popular among the matched users identified in the previous step.

At step 410, the program 112 re-sorts the items in the ranked list such that the top ranked items in the list are those found to be most popular or relevant to previous users whose online interactions match those of the targeted user. Thus, it will be appreciated that the present disclosure presents a customized list to each targeted user.

At step 412, the program 112 generates a web page with the re-sorted list and transmits it to the targeted user's device for display. The targeted user may select one of the items in the list for purchase through the e-commerce website.

As further understood by those skilled in the art, the program 112 can be in the form of microcode, programs, routines, and symbolic languages that provide a specific set or sets of ordered operations that control the functioning of the hardware and direct its operation, as known and understood by those skilled in the art. The program 112, according to an illustrative embodiment of the present invention, also need not reside in its entirety in volatile memory, but can be selectively loaded, as necessary, according to various methodologies as known and understood by those skilled in the art.

As further understood by those skilled in the art, the term "computer-readable medium" encompasses distribution media, intermediate storage media, execution memory of a computer, and any other medium or device capable of storing the program 112 implementing the functionality or processes of various embodiments of the present invention for later reading by a computer. The program 112 can be copied from the computer-readable medium to a hard disk or a similar intermediate storage medium. When the program 112, or portions thereof, are to be run, it can be loaded either from its distribution medium or its intermediate storage medium into the execution memory of the computer, configuring the computer to act in accordance with the functionality or method of various embodiments of this invention. All such operations are well known to those skilled in the art of computer systems.

According to an exemplary embodiment of the present invention, the program 112 can include a set of instructions that, when executed by the processor 104, causes the server 102, to perform the operations of: providing a user one or more product recommendations regarding products for sale on an e-commerce server associated with the system 100. The product recommendations may be displayed to users on the remote computers or devices 108 on a webpage, as viewed, for example, on a display of one or more remote user computers or devices 108, through the communication network 110, e.g., Internet.

To generate product recommendations, the program 112 causes the server 102 to track, using an electronic database, user interactions with an e-commerce website. The tracked information may include information regarding the steps users take to locate a product or products on an e-commerce website. For example, the tracked information may include tracking the search terms utilized by a user to locate a product. The tracked information may include a path through an online product catalog that a user selects to locate a product. The tracked information may include promotions clicked on by a user. The tracked information may include product restrictions used by a user to locate a product. The tracked information may include product attribute refinements clicked on by a user to locate a product. Thus, it will be appreciated that the tracked information may include any online behavior or website interactions of a user that is utilized to locate a product.

As will be explained below, the tracked information may be utilized to perform a localized sort of ranked products when a new user exhibits behavior that matches, or is similar to, the behavior of a previous user or group of users.

When a target user visits the e-commerce website, the target user's online behavior and website interactions are also tracked. For example, any website interaction by the user to refine product selection or to search for products is tracked as indicative of the target user's intent. The target user's website interactions are then matched against the website interactions of past users to determine the products that the target user is most likely to be interested in purchasing. Any ranked product list returned to the user is then locally sorted based on this information.

Example

For example, if a targeted user is looking at the entirety of a large online product catalog, the user may see a cubic zirconium (CZ) ring in the first position on the web page and a diamond ring on the tenth position because the CZ ring sells more units. If the user then restricts the catalog by clicking on an engagement rings refinement link, the items would reorder themselves based only on the data available from users who took the same step in restricting the catalog. If the diamond ring is sold to these users more than the CZ ring, it may take the first position, even if the CZ ring has sold more units overall and is ranked highest in popularity. Other actions leading to a localized or path specific sort might be search terms used prior to the display of results, promotions ads clicked on prior to display of results, etc. This is the end of the example.

In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description of the Disclosure by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure, and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A system for receiving a search results list from a computer search engine and re-ordering the search results list locally to personalize it to a target user of an e-commerce website, thereby providing product recommendations to the target user of the e-commerce website, said system comprising:
   a processor;
   a memory coupled to the processor;
   one or more user devices positioned remotely from and in communication with a server through an electronic communication network, wherein each user device presents the e-commerce website interface to at least one user, said interface outputting information to said user and receiving information input by said user;
   computer-readable instructions stored m the memory, that when executed by the processor, cause the processor to perform the operations of (i) causing the server to track user interactions with the e-commerce website by storing information about user interactions made by one or more individual users on the server, wherein the information stored is associated to individual users by storing the information input on each remote user device by each individual user on the server under a unique ID assigned to each individual user, wherein the tracked user interactions include: product refinements selected by each individual user, related products viewed by the individual user, a navigation path selected by the individual user through a product hierarchy, previous promotions selected by the individual user, product attributes selected by the individual user, the individual user's profile, purchases made by the individual user, and pricing information, (ii) causing the server to generate a list of one or more interactions specific to the target user, by using information stored about the target user, wherein the target user is one of the individual users with information stored under a unique ID by the server, (iii) causing the server to compare the list of the target user's interactions with a list of interactions of previous users to determine a subset of previous users whose previous interactions match those of the target user, (iv) receiving at the server an ordered list of products organized according to product rank generated by a search engine in response to a search query by the target user; (v) causing the server to match the target user's tracked interactions to a subset of the tracked interactions of the subset of previous users whose previous interactions match those of the target user to generate a subset of matched interactions; (vi) causing the server to re-order the ordered list of products based on the product rank among the subset of matched interactions to generate a sorted product list that is specific to the target user and based on the matched previous user interactions to said target user, and (vii) causing the server to display the sorted product list instead of the ordered list on a remote target user device in response to the search query made by the target user on the remote target user device.

2. The system of claim 1, wherein the list of product listings is a ranked list of product listings.

3. The system of claim 1, wherein the list of product listings is ranked, prior to sorting, by sales volume, highest to lowest.

4. The system of claim 1, wherein the tracked target user's interactions comprise search terms utilized to define a search request by the target user.

5. The system of claim 1, wherein the tracked target user's interactions comprise webpages viewed by the target user.

6. The system of claim 1, wherein the tracked target user's interactions comprise product listings viewed by the target user.

7. A method of receiving a search results list from a computer search engine and re-ordering the search results list to personalize it to a target user of an e-commerce website, thereby providing product recommendations to a user of an e-commerce website, said method comprising:
   presenting an interface generated by the e-commerce website on one or more user devices positioned remotely from and in communication with a server through an electronic communication network, wherein each user device presents the e-commerce website interface to at least one user, said interface outputting information to said user and receiving information input by said user;
   tracking user interactions with the e-commerce website made by one or more individual users interacting with the interface of the e-commerce website presented on each individual user's user device by storing information about the interactions with the e-commerce website on a server under a unique ID for each individual user, wherein the tracked interactions of each user include the following: product refinements selected by the individual user, related products viewed by the individual user, a navigation path selected by the individual user through a product hierarchy, previous promotions selected by the individual user, product attributes selected by the individual user, the individual user's profile, purchases made by the individual user, and pricing information;
   generating a list of one or more of a target user's interactions, using information stored about the target user on the server, wherein the target user is one of the individual users with information stored under a unique ID by the server;

comparing the list of the target user's interactions with a list of the interactions of previous users to determine a subset of previous users whose interactions match those of the target user;

receiving at the server an ordered list of products organized according to product rank generated in response to a search query by the target user;

matching the target user's tracked interactions to a subset of the tracked interactions of the subset of previous users whose previous interactions match those of the target user to generate a subset of matched interactions to determine the target user's intent, wherein the subset of the tracked interactions of the subset of previous users whose interactions match those of the target user is stored on the server;

re-ordering the ordered list of products based on the product rank among the subset of matched interactions specific to the target user, and based on the matched previous user interactions to said target user, to generate a sorted list of product listings specifically targeted to the user; and displaying the sorted list of product listings instead of the ordered list on a remote target user device in response to the search query made by the target user on the remote target user device.

8. The method of claim 7, wherein the list of product listings is a ranked list of product listings.

9. The method of claim 7, wherein the list of product listings is ranked, prior to sorting, by sales volume, highest to lowest.

10. The method of claim 7, wherein the tracked target user's interactions comprise search terms utilized to define a search request by the target user.

11. The method of claim 7, wherein the tracked target user's interactions comprise web pages viewed by the target user.

12. The method of claim 7, wherein the tracked target user's interactions comprise product listings viewed by the target user.

13. A non-transitory computer-readable medium for reading by a computer comprising computer-readable instructions operable to (i) cause a server to track user interactions with an interface generated by an e-commerce website and presented on one or more user devices positioned remotely from and in communication with the server through an electronic communication network, wherein each user device presents the e-commerce website interface to at least one user, and said interface outputs information to said user and receives information input by said user, by storing information about the interactions of each individual user with the e-commerce website on a server under a unique ID assigned to each individual user and generate a list of one or more interactions specific to a target user: wherein the interactions tracked by the e-commerce website include the following: product refinements selected by the user, related products viewed by the user, a navigation path selected by the user through a product hierarchy, previous promotions selected by the user, product attributes selected by the user, the user's profile, purchases made the user, and pricing information; (ii) compare the list of the target user's interactions with a list of interactions of previous users, (iii) receive at the server an ordered list of products organized according to product rank in response to a search query by a target user; (iv) use stored information about previous users to determine a subset of previous users whose previous interactions match those of the target user; (v) match a target user's tracked interactions to a subset of tracked interactions of the subset of previous users whose previous interactions match those of the target user to generate a subset of matched interactions; (vi) use the server to re-order the ordered list of products based upon the product rank among the subset of matched interactions to generate a sorted product list specific to the target user and based on the matched previous user interactions to said target user; and (vii) display the sorted product list instead of the ordered list on a remote target user device in response to the search query made by the target user on the remote target user device.

14. The non-transitory computer-readable medium of claim 13, wherein the list of product listings is a ranked list of product listings.

15. The non-transitory computer-readable medium of claim 13, wherein the tracked target user's interactions comprise search terms utilized to define a search request by the target user.

16. The non-transitory computer-readable medium of claim 13, wherein the tracked target user's interactions comprise product listings viewed by the target user.

* * * * *